United States Patent [19]

Arita et al.

[11] 4,387,143
[45] Jun. 7, 1983

[54] SILVER OXIDE PRIMARY CELL

[75] Inventors: Tomohiko Arita; Kaoru Murakami, both of Hirakata; Mitsugu Okahisa, Kyoto; Hiroshi Kumano, Daito, all of Japan

[73] Assignee: Matsushita Electric Industrial Co., Ltd., Osaka, Japan

[21] Appl. No.: 127,518

[22] Filed: Mar. 5, 1980

Related U.S. Application Data

[63] Continuation of Ser. No. 974,111, Dec. 27, 1978, abandoned.

[30] Foreign Application Priority Data

Dec. 29, 1977 [JP] Japan ............................. 52-157706

[51] Int. Cl.³ ............................................. H01M 2/26
[52] U.S. Cl. ..................................... 429/174; 429/219
[58] Field of Search ................................. 429/174, 219

[56] References Cited

U.S. PATENT DOCUMENTS

| 4,038,467 | 7/1977 | Lippold et al. | 429/219 |
| 4,113,929 | 9/1978 | Margalit | 429/219 |
| 4,121,021 | 10/1978 | Ogawa et al. | 429/219 |
| 4,136,236 | 1/1979 | Ruetschi | 429/219 |
| 4,139,683 | 2/1979 | Sauer et al. | 429/174 |

FOREIGN PATENT DOCUMENTS 2719865 11/1977 Fed. Rep. of Germany ...... 429/219

Primary Examiner—Donald L. Walton
Attorney, Agent, or Firm—Wenderoth, Lind & Ponack

[57] ABSTRACT

The disclosure relates to a silver oxide primary cell which includes a casing composed of a positive electrode container and a negative electrode container to define a sealed chamber between them, a positive electrode, an insulating layer, a negative electrode, a separator member, an electrically conductive member, and an insulating gasket housed in the sealed chamber.

The electrically conductive member is pressed, at its portion protruding toward peripheral edge portion of the positive electrode, against the bottom face of the positive electrode container by the insulating gasket, and is simultaneously electrically connected to the bottom face or side wall of the positive electrode container.

4 Claims, 7 Drawing Figures

SILVER OXIDE PRIMARY CELL

This is a continuation of application Ser. No. 974,111, filed Dec. 27, 1978, now abandoned.

BACKGROUND OF THE INVENTION

The present invention relates to a primary battery and more particularly, to a silver oxide primary cell of flat type including divalent silver oxide (AgO) as a main component of positive electrode (cathode) active material.

Following the recent progress in the field of electronics technology, various electronic instruments, such as electronic calculators, electronic wrist watches and the like have been generally reduced in size, and such a trend has now resulted in an increased demand for compact and small batteries, for example, button-type dry cells which may be employed as an external source of electric power to be installed in these electronic instruments.

Of the compact sized primary cells of the above described type, those having AgO as active material have been particularly required owing to their high energy density available despite of the small size thereof. However, divalent silver oxide primary cells fully satisfactory for the purpose have not conventionally been obtained as yet due to complication of structures, unstability of AgO, insufficient high rate discharge, etc. One of the problems inherent in the conventional silver oxide primary cells is that AgO tends to be decomposed in alkaline solution as in $2AgO \rightarrow Ag_2O + \frac{1}{2}O_2$ to evolve gases, thus resulting in a possibility of destroying the cells. Countermeasures essential to solving such a problem as described above may reside in how to dispose AgO under circumstances where it is prevented from decomposition as well as obtaining stable AgO in the form of powder. However, most of the prior arts in connection with the above relate to suppression of decomposition by addition of various additives, suppression of decomposition through electrolyte concentration, restriction of area coming into contact with the electrolyte, etc. for stabilization of AgO itself, and refer to nothing about the countermeasures from the structural point of view. Meanwhile, another problem in the conventional silver oxide primary cells is related to the discharge capacity thereof, and in the primary cells employing AgO, it is not preferable to mix electrically conductive material as in the known cells using monovalent silver oxide ($Ag_2O$), with consequent large internal resistance.

Furthermore, the conventional silver oxide primary cells employing AgO have another disadvantage that in the AgO-Zn cells, they show two stage discharge reaction of approximately 1.8 V for $AgO \rightarrow Ag_2O$ and approximately 1.5 V for $Ag_2O \rightarrow Ag$ due to discharge potential of AgO.

In order to overcome the disadvantage as described above, there have conventionally been proposed various methods for obtaining a single potential discharge from AgO, in which the known facts that electrical contact between AgO and current collecting member through $Ag_2O$ is required for achieving the single potential discharge and that such a state as described above spontaneously takes place in the process of AgO discharge reaction, are positively utilized for preliminarily providing structures suitable therefor.

The prior arts as described above include, for example, Japanese Laid Open Patent Application Tokkaisho 51-104534 in which, as shown in FIG. 6, the button type dry cell has a two-part container including a negative electrode (anode) container or cap 102, and a positive electrode (cathode) container or cup 101. An AgO layer 105 housed in the cup 101 is insulated from the cup 101 through a plastic layer 109, and simultaneously electrically contacts the cup 101 through a porous Ag layer Pb facing a negative electrode 103 which is accommodated in the cap 102, while the porous Ag layer Pb is electrically coupled with the AgO layer 105 through a porous layer Pa of monovalent silver oxide and also electrically connected to the cup 101 through a metallic annular contact member r, with a separator 107 and a liquid absorber 104 being further provided between the negative electrode 103 and AgO layer 105 and with an annular gasket 108 disposed between the cap 102 and cup 101 for sealing.

In the prior art disclosed in U.S. Pat. No. 3,655,450, the surface of an AgO pellet is covered with a continuous $Ag_2O$ layer which contacts a positive electrode container, while AgO is physically separated from the positive electrode container. Meanwhile, in Japanese Laid Open Patent Publications Tokkaisho Nos. 51-18823 and 51-18824, there is provided a discontinuous oxidizable metallic screen or ring between a positive electrode active material and a vertical wall of the positive electrode container or between the positive electrode and a separator.

In the prior art of U.S. Pat. No. 3,655,450 referred to above, it is necessary to cover the entire surface of the AgO pellet with $Ag_2O$, for which there are proposed several methods. In one of these methods in which, for example, the pellet surrounded by a thin $Ag_2O$ layer is forced into a cell container, there is a problem that the $Ag_2O$ layer is broken through deformation of the pellet during the insertion thereof under pressure. Another method in which the pellet is formed into $Ag_2O$ after pressing thereof into the container is advantageous in that the $Ag_2O$ layer is not damaged, but employment of reducing agent for reduction of AgO into $Ag_2O$ is required. Although U.S. Pat. No. 3,655,450 raises Zn, Cu, Ni and Ag as materials for the $Ag_2O$ layer, reaction tends to be slow and uneven, if sufficient electrolyte is not present thereat. Furthermore, AgO in its property becomes very unstable upon contact with reduction agent such as metals, etc. so as to be readily decomposed, while most of these metals after oxidation in the form of oxides adversely affect the stability of AgO. Moreover, with the increase of area over which $Ag_2O$ must be formed, the rate for utilization of the active material per volume is decreased, resulting in disadvantages in compact size batteries.

As described above, when AgO batteries are to be manufactured by the method of U.S. Pat. No. 3,655,450, there are involved many serious difficulties, with consequent necessity for high standard of quality control, and thus, the prior art method is not suitable for practical application.

Meanwhile, in Japanese Laid Open Patent Applications Tokkaisho Nos. 51-18823 and 51-18824 referred to earlier, the portion to be formed into $Ag_2O$ is limited more than that in U.S. Pat. No. 3,655,450 so as to form the $Ag_2O$ layer after insertion of the pellet into the container under pressure, and for the purpose, it is proposed to insert metallic materials such as Zn, Cu, Ag, Sn, Cd and Pb which can be readily oxidized. The known method as described above intends to fundamentally alter AgO into Ag₂O through electrochemical reduction and more specifically, to reduce AgO by the electric current produced through oxidizing reaction of oxidizable metals commonly contacting AgO and current collecting member owing to the so-called local cell reaction. Therefore, there is a possibility that, even when AgO is not continuously covered over its entire area, oxidation may extend over the portions which are not covered. In the case of the known method as described above, although reaction takes place rapidly as described in the specification thereof, the reaction is complicated depending on the relative positions of the oxidizable metals and current collecting member (i.e. positive electrode container), their quantities, shapes, state of penetration of electrolyte, etc., and all the portions of AgO contacting the positive electrode container are not necessarily formed into Ag₂O. The possibility of such inconveniences as described above may be anticipated from the statement in Japanese Laid Open Patent Application Tokkaisho No. 51-18823 that the initial discharging voltage by AgO is reduced to the discharging voltage by Ag₂O in a shorter period of time than in the absence of the oxidizable metals. Moreover, there are such disadvantages that the stability is remarkably deteriorated by the contact between the reducing metals and AgO and by oxides which are by-product of such contact, and also that the by-product material increases the internal resistance.

On the other hand, the arrangement of Japanese Laid Open Patent Application Tokkaisho No. 51-104534 mentioned earlier may be said to be more advantageous in the voltage stability than those in the foregoing prior arts in that, forming the large surface area of AgO into Ag₂O is not required, since the inner surface of the positive electrode container or cup is covered with the plastic layer. In the specification of the above known arrangement, a porous silver layer is disposed over the surface of the positive electrode, with a contact ring being employed for electrical conduction between the silver layer and positive electrode container. For producing the silver layer, there are disclosed two methods, and one of which is an electrochemical method through preliminary discharge only for the positive electrode, and the other of which is a chemical method through immersion of the positive electrode into a reducing solution. Both of the above described methods utilize the Ag layer obtained by the reduction of AgO, but the former method is disadvantageous in that a particular equipment is required for the purpose with unfavorable productivity, although the reaction amount is readily controlled, while in the latter method, the reaction amount is difficult to be regulated with uniform conductivity not being maintained in some cases, depending on the state of the layer formed, although mass-productivity thereof is generally favorable. Furthermore, disadvantages common to the both methods are such that, since immersion into the solution is effected before assembly of the battery, sufficient rinsing is required thereafter, for which rinsing process, much time is necessary, and if insufficient, solution leakage may take place after the assembly of the battery. Additionally, impurities in the rinsing water tend to affect adversely the stability of AgO. Furthermore, Japanese Laid Open Patent Application Tokkaisho No. 51-104534 as described above is very complicated in the arrangement thereof, and discloses the method for insertion under pressure either by partially covering only the lower half of the inner surface of the positive electrode container by the plastic film or by bending peripheral portions of sheet material piled up on the AgO pellet. In addition, it is essential that the contact ring uniformly contacts both the positive electrode container and AgO, and the technique required for the partial covering of the plastic film or physical state at the folded portion of the folded sheet tend to give rise to difficulties in manufacturing and unstability of quality of the resultant batteries, thus it being extremely difficult to produce particularly compact sized thin and flat batteries.

SUMMARY OF THE INVENTION

Accordingly, an essential object of the present invention is to provide an improved silver oxide primary cell particularly of flat type which is superior in voltage stability and discharge performance, with stable positive electrode material mainly composed of divalent silver oxide.

Another important object of the present invention is to provide an improved silver oxide primary cell of the above described type which is compact in size and simple in construction.

A further object of the present invention is to provide an improved silver oxide primary cell of the above described type which can be readily manufactured at low cost on a large scale through simple quality control.

In accomplishing these and other objects according to one preferred embodiment of the present invention, the silver oxide primary cell for use in electrical and electronic equipment comprises a casing composed of a positive electrode container and a negative electrode container electrically insulated from and received in said positive electrode container to define a sealed chamber between said positive electrode container and negative electrode container, a positive electrode mainly composed of divalent silver oxide and disposed at approximately central portion of said positive electrode container, an electrically insulating layer for separating inner bottom surface of said positive electrode container from said positive electrode, a negative electrode housed in said negative electrode container, a separator member for separating said positive electrode from said negative electrode, an electrically conductive member provided on the surface of said positive electrode confronting said negative electrode, and an annular electrically insulating gasket disposed between said positive electrode container and said negative electrode container. The electrically conductive member is pressed, at its portion extending out of peripheral edge portion of said positive electrode, against the bottom face of said positive electrode container by said electrically insulating gasket, and is simultaneously electrically connected selectively to the bottom face or side wall of said positive electrode container.

By the arrangement of the present invention as described above, an improved silver oxide primary cell of flat type superior in voltage stability and discharge performance has been advantageously presented, with substantial elimination of disadvantages inherent in the conventional silver oxide primary cells of the kind.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
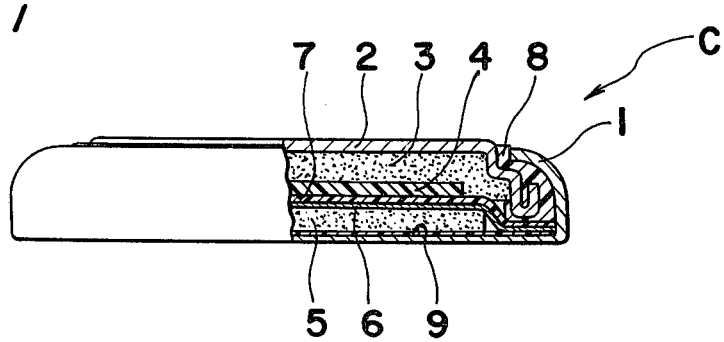
FIG. 1 is a longitudinal sectional view of an improved silver oxide primary cell according to one preferred embodiment of the present invention.

In the first place, it is to be noted that the silver oxide primary cell according to the present invention is particularly characterized in that the positive electrode mainly composed of AgO as active material is disposed at an approximately central portion of a positive electrode container or a cup through an insulating layer with respect to the bottom of the positive electrode container, with a clearance provided with respect to the side wall of the positive electrode container, while the peripheral edge of a porous electrically conductive member provided at the surface of the positive electrode confronting a negative electrode is arranged, at the portion of said clearance, to contact the bottom surface of the positive electrode container under pressure by an annular insulating gasket provided between the negative electrode container and positive electrode container. It is to be noted here that the electrically conductive member as described above is electrically connected to the positive electrode container by causing the peripheral edge of the conductive member to directly contact the bottom surface or side wall of the positive electrode container, or by causing the contact ring to contact the electrically conductive member by depressing said annular insulating gasket.

According to the present invention, since the portion contacting the metal and giving rise to the decomposition of AgO is limited to the surface confronting a negative electrode (anode), generation of gas due to the decomposition of AgO is small, with consequent superior stability of voltage. Furthermore, since the insulating layer for separating the positive electrode from positive electrode container is required to be provided only at the bottom of the positive electrode container, assembly of the cells is facilitated with improved reliability, as compared with cells in which the insulating layer is also provided at the side wall of the positive electrode container. In addition, if it is so arranged that the electrically conductive member is preliminarily formed into a dish-like configuration for insertion of the positive electrode pellet therein with the peripheral edge of the conductive member being secured to the sheet constituting the insulating layer at the bottom of the positive electrode container, for example, with wax, etc., the assembly of the cells is much facilitated. Moreover, owing to the construction that the insulating gasket is pressed against the bottom surface of the positive electrode container through the clearance between the side wall of the positive electrode container and the positive electrode, it is possible to carry out tightening by utilizing a length approximately equal to the total height of the cell, with consequent improvement on the degree of sealing and resistance against leakage. It is another advantage of the silver-oxide cell according to the present invention that, since the negative electrode is strongly pressed against positive electrode, performance for heavy load discharge and discharge at low temperature is improved, in cooperation with the arrangement that the conductive member evenly contacts the surface of the positive electrode confronting the negative electrode. In the practical application, it is preferable that the peripheral edge of the separator is also disposed under the insulating gasket.

In the flat-type cells as described in the foregoing, it is a general practice to employ positive electrode pellets molded under high pressure for improving the density of the filled active material, and the pellets molded into disc-like shape under high pressure have better penetration to liquids at the side portion thereof than at their upper and lower surfaces. According to the present invention, since the side face of the positive electrode is in approximately open state, favorable penetration of the electrolyte can be expected with improved high rate discharge.

It is further to be noted that according to the present invention, not only AgO, but a mixture of AgO and $Ag_2O$ may be employed as the active material.

Commonly, since AgO is unstable in its property as described earlier, it is liable to be decomposed in alkaline solution, being readily affected especially by impurities, and upon contact thereof, for example, with AgO, most of metals are oxidized, with AgO reduced in the above case being very unstable so as to be in a state that it is readily decomposed further. Moreover, many of the oxides produced from the oxidized metals tend to accelerate the oxidation of AgO. According to the measurements for the decomposition speeds of AgO taken by the present inventors, Co, Ni, Fe, Cr, Ti, Pt, Pd, etc., accelerated the decomposition, while Ag, Zn, Ta, Al, etc. did not particularly accelerate the decomposition when influence of the oxides over the decomposition of AgO was represented by the above mentioned element names.

Generally, the positive electrode containers for the conventional flat type or button type cells are formed by nickel-plated iron, nickel, stainless steel and the like as mentioned earlier, with positive electrode active material contacting the positive electrode container for simultaneously utilizing the positive electrode container as a positive electrode current collecting member. However, due to the reason as mentioned earlier, contact of the positive electrode container with AgO is not preferable. Therefore, the current collecting member should be separately provided, and in such a case, Ag which is the resultant substance of the battery discharge in AgO may be used, but employment of metals which reduce only a small amount of AgO and form thin and fine oxide layers is desirable. Even in these metals as described above, the degrees of decomposition acceleration thereof differ from each other in the order as shown below.

Co>Stainless steel>Ni>Fe>Ti>Ag>Ta>Au

Taking the above facts into account, it is preferable to employ iron or nickel material having gold or silver plated on the surface thereof as the electrically conductive member for the positive electrode.

Although it is a general practice to mix graphite into cells employing $Ag_2O$, inclusion of graphite is not preferable for stability of AgO, while use of silver powder having reducing function should be avoided as far as possible, and if it is inevitable to use graphite or silver powder, the total surface area of its particles must be kept as small as practicable to provide high electrically conductive effect.

In cases where the electrically conductive material is not included in the AgO active material, the current collecting member plays a very important role, and in the ordinary button-type cells, the positive electrode starts reaction from the vicinity (i.e. at peripheral portion on the surface contacting the positive electrode container in the case of the $Ag_2O$ batteries) of the current collecting member on the surface confronting the negative electrode toward the central portion on the surface, and the reaction further proceeds toward the bottom portion gradually. At this time, since the reaction hardly proceeds from the bottom portion and the side portion, the contact between the positive electrode container and the active material is not required as a matter of fact. Accordingly, the current collecting member should be disposed on the surface confronting the negative electrode, by which arrangement, decomposition of AgO by the material of the positive container may be reduced to minimum, so that the current distribution in the positive electrode is improved. In the case as described above, the electrically conducting member is required to be porous for allowing the current and electrolyte to pass therethrough when the conducting member covers the majority of the face of the positive electrode confronting the negative electrode. For the purpose, three dimensional reticulated porous body, for example, an expanded metal "Selmet" (name used in trade and manufactured by Sumitomo Electric Industries, Ltd. of Japan), wire gauze of 20 to 150 meshes, carbon fiber paper, etc. may be employed. Particularly, the three-dimensional reticulated porous member is preferable, since the reticulated porous member is provided with liquid retaining property on the surface thereof to perform cushioning action with respect to the negative electrode if the thickness thereof is properly selected.

Additionally, porous plastic film, non-woven fabric, etc. each having superior resistance against oxidation and alkali and coated with gold or silver by known methods may be employed. Moreover, a sheet arranged to have metal at least on one surface thereof confronting the positive electrode through, for example, vacuum deposition, sputtering, chemical plating, etc., may be employed as the conductive member, which is particularly suitable for cells of flat type.

Referring now to the drawings, there is shown in FIG. 1 a silver oxide primary cell C of flat type according to one preferred embodiment of the present invention. The cell C has a two-part container or casing including a positive electrode container or cup 1 made, for example, of nickel plated steel and serving as a positive terminal, and a negative electrode container or cap 2 made, for example, of a clad plate of stainless steel lined with copper and serving as a negative electrode. The negative electrode container 2 houses therein a zinc negative electrode 3 composed of amalgamated zinc powder. For electrolyte, potasium hydroxide, sodium hydroxide or mixture thereof may be used, with addition of gelatinizer thereto, depending on necessity. A liquid absorbing material 4 may be composed of nylon, polypropylene, etc., although this may be dispensed with where possible.

The positive electrode 5 contained in the positive electrode container 1 has a diameter which allows sufficient space to be provided with respect to the side wall of the container 1. On the upper surface of the positive electrode, there is disposed a porous electrically conductive member 6, which has a sufficient size at the portion thereof extending out of the positive electrode, to be pressed against the bottom face of the container 1 through a gasket described later. A separator 7 provided between the positive and negative electrodes is composed of a laminated layer of radiant ray graft polyethylene, and cellophane or of ion-exchange film, micro-porous film, etc., for which resistance against oxidation and alkali is required. In the space between the positive electrode container 1 and negative electrode container 2, there is provided an annular insulating gasket 8 made, for example, of nylon, polyethylene or the like. Meanwhile, in the positive electrode container 1, there is disposed an insulating layer 9 between the positive electrode 5 and the bottom surface of the container 1.

Figure 2:
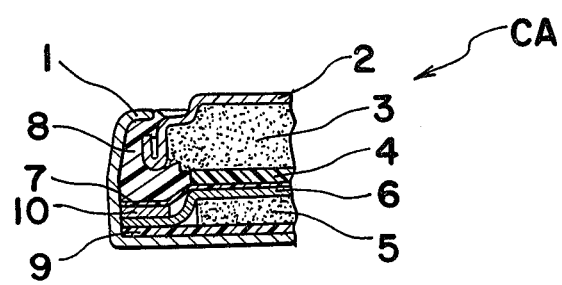
FIG. 2 is a fragmentary sectional view, on an enlarged scale, of an improved silver oxide primary cell according to a modification of the present invention.

Referring to FIG. 2, there is shown a modification of the arrangement of FIG. 1. In the modified cell CA in FIG. 2, there is further provided a contact ring 10 made, for example, of steel, nickel plated steel and the like between the separator 7 and the conductive member 6 for allowing the conductive member 6 to perfectly contact the positive electrode 5 and the side wall or bottom face of the container 1. The contact ring 10 may be replaced by one which is silver or gold plated.

Still referring to FIGS. 1 and 2, the positive electrode 5 is formed by molding AgO or the mixture of AgO and $Ag_2O$ into pellet shape, with fluorine resin being further added depending on necessity. The positive electrode 5 is disposed through the insulating layer 9 to prevent AgO from becoming unstable due to contact thereof with the positive electrode container 1. The insulating layer 9 should be of fluorine resin, polyethylene or the like by which AgO is not readily reduced, and may be of non-porous film, porous film, non-woven fabric, etc. to be provided with resiliency. Similarly, materials which are impregnated with electrolyte may also be selected for the purpose. Meanwhile, for the insulating layer 9, metallic oxides which are not harmful to AgO, for example, MgO, CaO, $Al_2O_3$, $In_2O_3$, etc. may be selected to suit to the requirement. The insulating layer 9 should preferably be located under at least the positive electrode 5, but may be located all over the bottom face of the positive electrode container 1. In addition, water repelling agent such as fluorine resin, paraffin or the like may be applied onto the portion located under the gasket 8 or the peripheral portion may be melted through heating to provide the water repelling property, whereby the liquid-leakage preventing effect can be provided.

The conductive member 6 is provided for electrical conduction between the positive electrode 5 and the positive electrode container 1, and is required to come into contact with not only the positive electrode 5, but also the side wall portion or the bottom portion of the container 1. The contact ring 10 as described with reference to FIG. 2 may be inserted for further ensuring the contact in the above case. The contact ring 10 may also serves for prevention of liquid-leakage. For the shape of the conductor 6, proper combination of wire, plate or the like, and perforated plate, expanded metal, lath plate, net or three-dimensional reticulated porous body compressed into thin layer to a proper thickness may be employed as described earlier. On the contrary, the electrically conductive member may be replaced by a deposited layer of gold or silver provided on the surface of the positive electrode 5 by known methods.

Figure 3A:
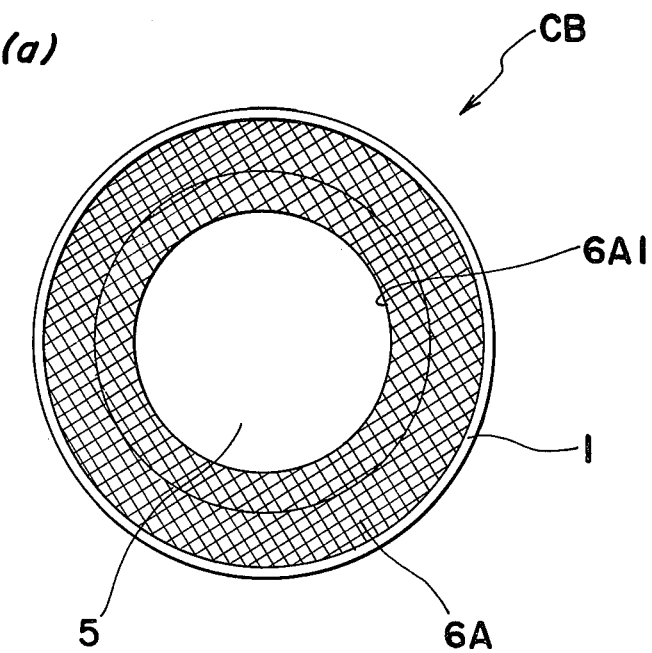
FIG. 3(a) is a top plan view showing a construction of a silver oxide primary cell according to another modification of the present invention, with a negative electrode container or cap thereof removed for clarity.
Figure 3B:
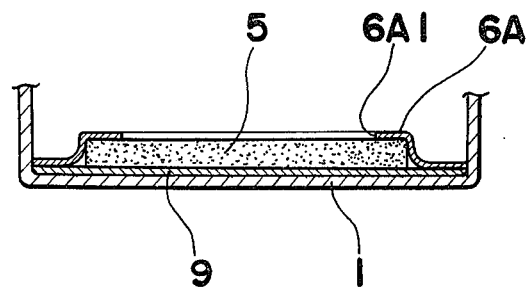
FIG. 3(b) is a longitudinal sectional view of the cell of FIG. 3(a)
Figure 4:
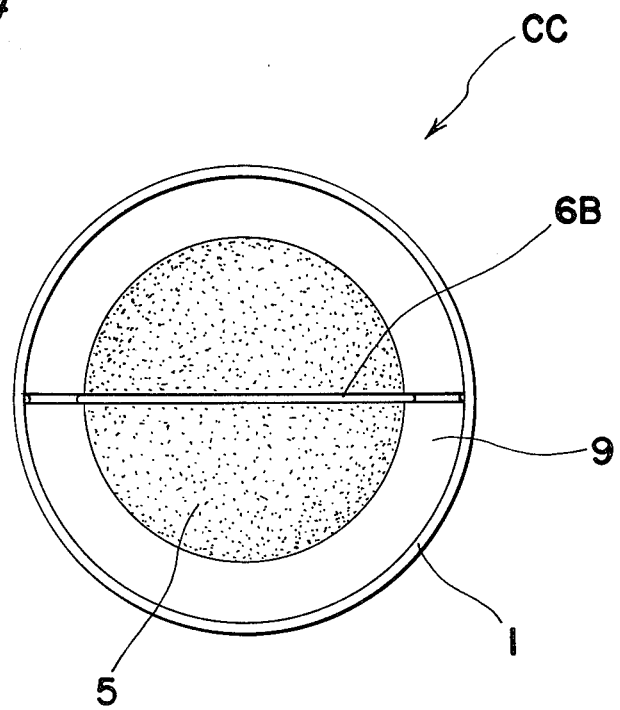
FIG. 4 is a similar view of FIG. 3(a), but particularly shows a further modification thereof.

Referring now to FIGS. 3(a), 3(b) and 4, there are shown further modifications of the silver oxide primary cell 1 of FIG. 1. In the modified cell CB of FIGS. 3(a) and 3(b), the disc-like electrically conductive member 6 described as employed in the arrangement of FIGS. 1 and 2 is replaced by an annular conductive member 6A, for example, of lath plate having an opening 6A1 at its central portion, with the corresponding surface of the positive electrode 5 being covered at the periphery edge of the opening 6A1. The conductive member 6A may not necessarily be of porous member. Meanwhile, in the modified cell CC in FIG. 4, the conductive member 6 of FIG. 1 is replaced by a single metallic wire 6B. It is to be noted here that the single metallic wire 6B may be further replaced by two or more than three metallic wires (not shown) disposed to cross each other on the positive electrode 5 or by other metallic belts or the like so far as they serve the purpose as the conductive member.

The conductive member made, for example, of silver porous member should most preferably be of disc-like configuration from the view point of battery characteristics, but the disc-like shape may be in some cases disadvantageous from the view points of cost and of assembly of the cells due to comparatively weak mechanical strength. Accordingly, for the practical purpose, it is preferable to employ a porous member of nickel material as the conductive member of FIG. 1, with the surface thereof which contacts the positive electrode being plated with silver, or to adopt the combination of the nickel porous member and a silver porous member (not shown) disposed at the surface of the nickel porous member contacting the positive electrode.

The advantage by employing elastic member such as non-woven fabric or the like for the insulating layer 9 at the bottom of the positive electrode container 1 is as follows. Generally, the negative electrode using zinc becomes Zn→ZnO through proceeding of discharge, and apparent volume thereof increases and the electrolyte becomes somewhat insufficient, thus resulting in extremely tightly packed state. As a result, sufficient discharge capacity may not be obtained or the heavy load discharge may be insufficient. If the negative electrode expands when the elastic non-woven fabric, etc. which contains sufficient electrolyte, exists under the positive electrode, the force which is very strong overcomes the supporting force of the conductive member on the positive electrode surface, and depresses the positive electrode downwardly. Consequently, the electrolyte under the positive electrode pellet is pushed out sideways and upwardly, to serve for efficient supply of the electrolyte necessary for the discharge.

Hereinbelow, examples and comparative data are inserted for the purpose of illustrating the present invention without any intention of limiting the scope thereof.

EXAMPLE 1

The cell employed for EXAMPLE 1 had a construction similar to the cell C as shown in FIG. 1, with dimensions thereof being 11.6 mm in diameter and 2 mm in height. For the positive electrode, a pellet was prepared by molding a mixture of 0.16 g of AgO powder and 2% by weight of polytetrafluoroethylene into a size of 7.8 mm in diameter and approximately 0.5 mm in thickness under pressure of approximately 6 tons per $cm^2$. For the insulating layer 9, a film, $25\mu$ in thickness, composed of tetrafluoroethylene-hexafluoropropylene copolymerized resin is provided under the positive electrode. For the conductive member 6, three-dimensional reticulated porous silver of approximately 5% in porosity and 0.1 mm in thickness was employed, the size thereof being so arranged that the surrounding portion thereof contact the exposed bottom face of the container 1. Also, for the separator 7, polyethylene grafted with radiant ray was used. Prior to the sealing, an electrolyte of 10 $\mu l$ composed of potassium hydroxide aqueous solution of 10 mol/l is injected into the positive electrode.

On the other hand, for the negative electrode, the mixture of carboxymethylcellulose of 2% by weight and amalgamated zinc powder of 0.09 g was prepared, and filled within the inner face of the negative electrode container or cap 2. Subsequently, after injection of 25 $\mu l$ of electrolyte, the opening of the container 1 was sealed. Since the above described arrangement makes it possible to provide electrical conduction from the bottom portion of the container 1 to the current collecting member, the thin and flat cell structure may be readily achieved.

EXAMPLE 2

Polypropylene non-woven fabric was used as the insulating layer 9 so that the entire bottom face of the container 1 may be almost covered. For the conducting member 6, gold-plated three-dimensional reticulated porous nickel of approximately 5% in porosity and 0.1 mm in thickness was used, with the peripheral portion thereof being made to contact the side wall of the container 1. Other construction were the same as those in EXAMPLE 1.

EXAMPLE 3

For the insulating layer 9, polypropylene non-woven fabric of a size sufficient to cover up to the peripheral portion of the bottom of the container was employed. Water repelling agent composed of polytetrafluoroethylene chloride of low molecular weight was applied onto the peripheral portion. The conducting member 6 was of three-dimensional reticulated porous silver similar to that in EXAMPLE 1. A portion which accommodates the positive electrode pellet was preliminarily molded, while the peripheral portion was compressed to be thin for facilitation of manufacturing, a nickel contact ring 10 as shown in FIG. 2 was employed. Thereafter, prior to assembly, the electrolyte was injected into the positive electrode by 15 $\mu l$. Other constructions were similar to those in EXAMPLE 1.

EXAMPLE 4

The nickel net of 100 meshes was used for the conductive member 6. The nickel net was preliminarily formed with a portion, into which the positive electrode pellet was accommodated. Other constructions were similar to those in EXAMPLE 3.

EXAMPLE 5

The conductive member 6 was prepared by polyethylene porous film gold-sputtered on its one side face which was brought into contact with the positive electrode. The gold-plated nickel as the contact ring was disposed between the conductive member and the insulating layer. Other constructions were similar to those in EXAMPLE 3.

EXAMPLE 6

For the conductive member 6, the nickel expanded metal was used. The three-dimensional reticulated porous silver similar to that in EXAMPLE 1 was disposed only at the portion where the expanded metal comes into contact with the positive electrode pellet. Other constructions were similar to those in EXAMPLE 1.

EXAMPLE 7

For the conductive member 6, one nickel wire of 0.4 mm in diameter was disposed on the surface of the positive pellet in the diametrical direction as shown in FIG. 4, with the end thereof adapted to contact the exposed bottom face of the container 1. Other constructions were similar to those in EXAMPLE 1.

COMPARATIVE EXPERIMENT A

The insulating layer 9 of EXAMPLE 1 was removed.

COMPARATIVE EXPERIMENT B

The conductive member 6 and insulating layer 9 of EXAMPLE 1 were removed.

COMPARATIVE EXPERIMENT C

Figure 5:
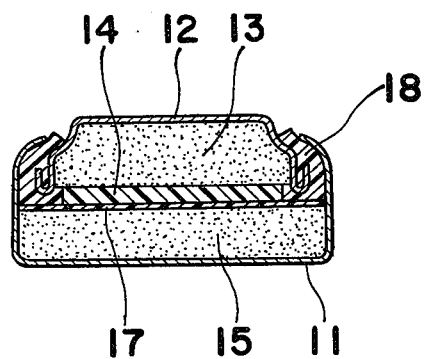
FIG. 5 is a longitudinal sectional view of a conventional silver oxide primary cell employed in a comparative experiment in the present invention.

A cell 11.6 mm in diameter and 4.2 mm in height having a known construction similar to that in U.S. Pat. No. 3,655,450 as shown in FIG. 5 was employed. In FIG. 5, the cell comprises the positive electrode container or cup 11 including the positive electrode 15 therein, the negative electrode container or cap 12 having the negative electrode 13 housed therein, the electrolyte absorbing member 14 and separator 17 disposed between the electrodes 13 and 15, and the insulating gasket 18 held between the cap 12 and cup 11. The amount of amalgamated zinc amount for the negative electrode was 0.24 g, while the AgO amount of the positive electrode was 0.58 g. The electrolyte amounts injected into the negative electrode and the positive electrode were 70 and 10 $\mu$l, respectively.

COMPARATIVE EXPERIMENT D

Based on U.S. Pat. No. 3,655,450, the cell employed had a construction as shown in FIG. 5. After zinc plating of 3$\mu$ in thickness has been applied onto the inside face of the positive electrode container, the positive electrode pellet of AgO was inserted thereinto. The weight of the negative electrode was 0.09 g, and the injected amount was 25 $\mu$l, while the weight of the positive electrode was set to be 0.16 g. The injected amount was 10 $\mu$l. The size of the cell was 11.6 mm in diameter and 2 mm in height.

COMPARATIVE EXPERIMENT E

In the construction of FIG. 5 based on Japanese Laid Open Patent Application Tokkaisho No. 51-18823, a zinc expanded metal disc of a predetermined size was disposed on the bottom portion of the positive electrode container for the positive electrode and on the side face thereof confronting the negative electrode. The cell was similar in size, positive or negative electrode weights and injected amount, to that of the comparative experiment C.

COMPARATIVE EXPERIMENT F

Figure 6:
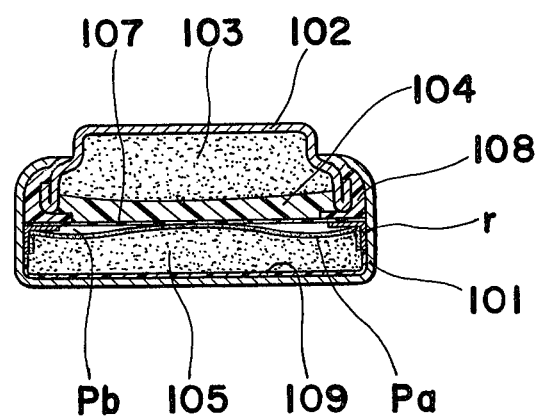
FIG. 6 is a view similar to FIG. 5, but particularly shows a construction of another conventional silver oxide primary cell.

A cell of 11.4 mm in diameter and 4.2 mm in height as shown in FIG. 6 was prepared based on Japanese Laid Open Patent Application Tokkaisho No. 51-104534. AgO layer 105 was inserted into the container 101 through an insulating layer 109 composed of fluorine resin sheet. The previous treatment discharging is performed at predetermined current to form the silver layer Pb on the surface. Weight of the positive electrode was 0.50 g. The injected amount thereof was 10 $\mu$l and the weight of the negative electrode was 0.24 g. The injected amount was 70 $\mu$l.

Respective ten cells thus manufactured were subjected to the following tests for comparison of the average characteristics thereof. After the cell has been manufactured, open-circuit voltage after the preserving aging at 45° C. for 34 hours was set to be initial voltage. The cell was preliminarily discharged for 6 minutes at a constant-current of 10 mA. Then, the open-circuit voltage after leaving the cell at 45° C. for 24 hours was measured, and the internal impedance was measured at 1,000 Hz. Also, these cells were subjected to repeated pulse discharge for 5 seconds in closed circuit and 55 seconds in open circuit through a resistance of 100Ω at a temperature of −10° C. for measurements of closed circuit voltages after 10 minutes and 20 hours respectively. Meanwhile, another set of 10 cells were subjected to preservation test. They were preserved at 60° C. for a month for measurements of increase (swelling) in the height of the cells during the period and ratio with respect to the early stage of the remaining capacity. In addition, 20 cells each of EXAMPLES 1 and 3, and comparative experiments C and F were prepared for comparison of liquid leakage when they were stored under the circumstance of 60° C. in temperature and 90% in relative humidity. These results are shown in the Table below.

| | After preliminary discharge & leaving | | Pulse discharge (V) | | 60° C. one month reserve | | Defective |
|---|---|---|---|---|---|---|---|
| Initial voltage (V) | voltage (V) | Internal impedance (Ω) | 10 minutes later | 20 hours later | Expansion (mm) | Capacity residual factor (%) | factor (%) due to liquid leakage |
| EXAMPLE | | | | | | | |

-continued

| | Initial voltage (V) | After preliminary discharge & leaving | | Pulse discharge (V) | | 60° C. one month reserve | | Defective factor (%) due to liquid leakage |
|---|---|---|---|---|---|---|---|---|
| | | voltage (V) | Internal impedance (Ω) | 10 minutes later | 20 hours later | Expansion (mm) | Capacity residual factor (%) | |
| 1 | 1.58 | 1.59 | 3.0 | 1.33 | 1.24 | 0.02 | 94 | 5 |
| 2 | 1.62 | 1.59 | 2.9 | 1.34 | 1.28 | 0.04 | 91 | — |
| 3 | 1.59 | 1.59 | 1.9 | 1.36 | 1.32 | 0.03 | 92 | 0 |
| 4 | 1.63 | 1.58 | 3.2 | 1.32 | 1.30 | 0.08 | 89 | — |
| 5 | 1.62 | 1.57 | 3.5 | 1.31 | 1.30 | 0.03 | 90 | — |
| 6 | 1.60 | 1.59 | 3.0 | 1.33 | 1.24 | 0.03 | 92 | — |
| 7 | 1.62 | 1.58 | 6.0 | 1.20 | 1.20 | 0.03 | 93 | — |
| Comparative experiment | | | | | | | | |
| A | 1.75 | 1.81 | 3.0 | 1.33 | 1.24 | 0.23 | 77 | — |
| B | 1.83 | 1.83 | 50.0 | 0.81 | 0.41 | 0.40 | 75 | — |
| C | 1.84 | 1.83 | 30.0 | 0.92 | 0.21 | 0.50 | 76 | 20 |
| D | 1.65 | 1.76 | 40.0 | 0.78 | 0.28 | 0.33 | 77 | — |
| E | 1.79 | 1.81 | 35.0 | 0.93 | 0.30 | 0.25 | 79 | — |
| F | 1.62 | 1.57 | 9.0 | 1.01 | 0.91 | 0.07 | 90 | 20 |

When the cell using AgO is employed, for example, for watches, the initial voltage stability is required, which should preferably be 1.65 V or less. According to the present invention, the requirement was satisfied even in the initial voltage and if the preliminary discharge was performed, further stabilization was expected, with the performance being maintained even after three months' storage at 60° C., although the cells of the comparative experiments were incomplete with the exception of the cell in the comparative experiment F. This is attributable to the fact that AgO comes into direct contact with the positive electrode container or undesirably contacts said container due to difficulty in manufacturing process, thus resulting in deviation of performance, with consequent incomplete average performance.

According to the present invention, the initial voltage does not become high in particular even if nickel or gold is used as the conductive material, since the contact area with AgO is smaller as compared with that of the positive electrode container inner face and the electrolyte of sufficient amount exists in this portion. The initial voltage is higher than a case where the conductive material is of silver, but this disadvantage may be eliminated through longer aging time or by preliminary discharge. If the conductive material is of silver or silver-plated, it reacts with AgO immediately, producing $Ag_2O$ to indicate electric potential of $Ag_2O$.

When stored at high temperatures, the cell expands or swells, based on the decomposition of AgO. The result comes from the contact area between the conductive material and AgO. Although the amount of the positive electrode active material is different due to difference in size (height) of the sample cells, even if such amount is taken into consideration, the above-described difference is obvious.

The residual capacity after the preservation is considered to be based on the decomposition of AgO, and is related to electrolyte amount at the location where the conductive material contacts AgO pellet and also to the insulating material. Thus, fluorine resin is expected to be most stable against AgO.

The internal resistance and pulse discharge characteristics indicate that the construction of the present invention is extremely superior. The comparative experiment A indicates that the internal resistance is reduced, although AgO comes into contact with the positive electrode container. Since the comparative experiment F also shows relatively small internal resistance, the effect by the conductive material on the surface of the positive electrode may be ensured. Particularly, the construction according to the present invention is different from that of the comparative experiment F, and since the conductive material and the separator can be pressed against the positive electrode pellet surface from the peripheral portion, better contact is provided, with the internal resistance being made smaller. In addition, the absorbing property and resiliency by the non-woven fabric under the pellet make it possible to obtain a high closed-circuit voltage even after the long hours' discharging. Also, according to the construction of the present invention, the electrolyte can penetrate into the positive electrode active material from the top face, side face and underside face of the pellet, and since a sufficient amount of electrolyte exists, there is a marked difference in discharge performance between the present invention and the comparative experiment F. The discharge performance of the cell cannot be regarded as exactly the same according to sizes (heights) of the cells. However, in the constructions of the conventional arrangements, the cell is difficult to be made thinner. Also, the initial heavy load discharge performance tend to depend upon the cell diameter, and after the discharge has proceeded, the thinner cell is rather disadvantageous. Thus, the characteristics earlier mentioned may be properly evaluated.

The difference in the discharge characteristics has been confirmed not only by the above-described conditions, but also by normal temperatures and continuous discharge.

According to the construction of the present invention, since the gasket is strongly pressed directly against the hard surface of the positive electrode container, with the water repelling agent being applied onto the peripheral portion, it is noticed that the effects as described above are further increased.

Some of the effects as described hereinabove may be applied to $Ag_2O$ cell.

As is clear from the foregoing description, the present invention has remarkable advantages in suppressing the decomposition of AgO, and also in achieving favorable single potential discharge stability and heavy load discharge performance, from the viewpoint of technique for thinner cell formation, thus contributing to this line of industry to a large extent.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A silver oxide primary cell for use in electrical and electronic equipment which comprises:
    a casing composed of a positive electrode container and a negative electrode container electrically insulated from and received in said positive electrode container to define a sealed chamber between said positive electrode container and negative electrode container;
    a positive electrode mainly composed of divalent silver oxide and disposed at approximately the central portion of said positive electrode container;
    an electrically insulating layer for separating the inner bottom surface from said positive electrode;
    a negative electrode housed in said negative electrode container;
    a separator member for separating said positive electrode from said negative electrode;
    an electrically conductive member composed of nickel porous member covering the surface of the positive electrode confronting the negative electrode, and at least contacting the positive electrode active substance through a silver layer provided on the surface of said positive electrode confronting said negative electrode; and
    an electrically insulating gasket disposed between said positive electrode container and said negative electrode container
    a peripheral portion protruding from the positive electrode peripheral edge portion of said electrically conductive member and extending into the gap between the positive electrode and the positive electrode container being pressed, against the bottom face of said positive electrode container by said electrically insulating gasket, and simultaneously being electrically connected to the bottom face or side wall of said positive electrode container.

2. A silver oxide primary cell as claimed in claim 1, wherein said electrically conductive member is composed of said nickel porous member and wherein the silver layer is a porous silver layer provided at the surface of said electrically conductive member contacting said positive electrode.

3. A silver oxide primary cell as claimed in claim 1, wherein said electrically insulating layer is of non-woven fabric.

4. A silver oxide primary cell as claimed in claim 1, wherein said electrically insulating layer is composed of non-electrically conductive plastics having resiliency.

* * * * *